United States Patent Office 3,222,126
Patented Dec. 7, 1965

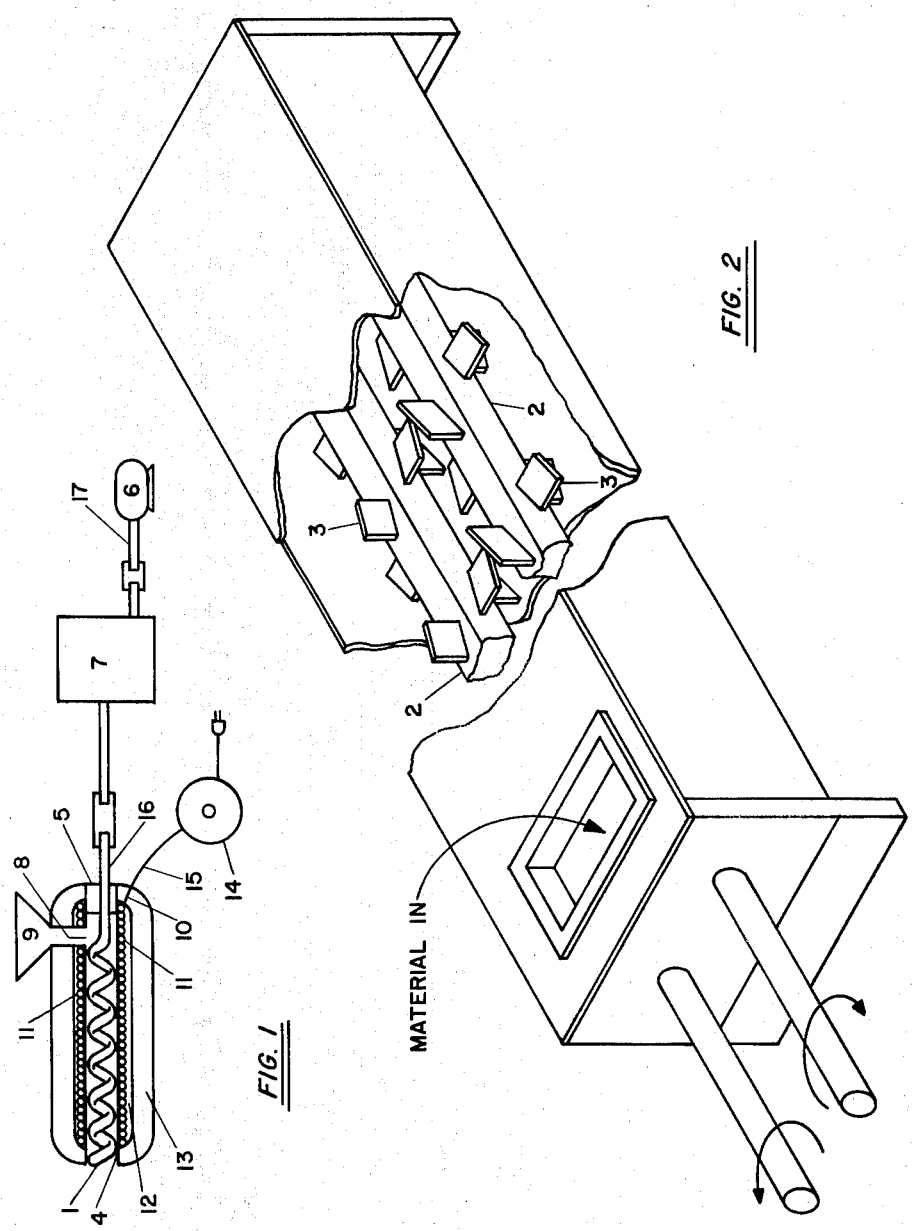
HERBERT A. BASKIN – *INVENTOR*

3,222,126
PROCESS FOR PREPARING CALCIUM CYANATE
Herbert A. Baskin, Covington, Tenn., assignor to W. R. Grace & Co., New York, N.Y., a corporation of Connecticut
Filed July 30, 1963, Ser. No. 298,557
7 Claims. (Cl. 23—75)

This is a continuation in part of my copending application Serial Number 209,250, filed July 11, 1962, now abandoned.

This invention relates to calcium cyanate. In one particular aspect the invention relates to a process for preparing free-flowing calcium cyanate.

In summary, this invention is directed to a process for preparing free-flowing particulate calcium cyanate. The method comprises preparing a feedstock consisting essentially of particulate urea and particulate lime (calcium oxide, calcium hydroxide, or a mixture thereof) blended in a urea:lime mole ratio of about 0.8–1.2:1 with about 8–20 times its weight of a diluent consisting essentially of the product of said process and passing the thus formed mixture through a heated reaction zone at such rate as to provide a residence time therein of at least ½ minute while said reaction zone is maintained at about 200–320° C. and substantially at atmospheric pressure. The preferred method for initiating the reaction comprises preparing a heel of calcium cyanate for use as simulated recycle stock, and mixing the lime-urea feedstock with the aforesaid heel in the weight ratio of about 8–20 parts heel to 1 part of feedstock. A preferred method for preparing calcium cyanate heel comprises blending lime and urea in a lime:urea mole ratio of about 10:1, passing the resulting mixture through the said reaction zone, collecting the product, blending said product with about 0.1 mole of urea for each mole of lime originally present, and passing the resulting mixture through the said reaction zone. This procedure is repeated until about one mole of urea has been added for each mole of lime originally present. The resulting heel usually analyzes about 35–50% by weight Ca(OCN)$_2$.

In the drawings: FIG. 1 is a side sectional elevation of one preferred apparatus. FIG. 2 is a perspective view, with parts cut away, of another preferred apparatus.

As normally operated, the process of this invention gives a calcium cyanate product analyzing substantially as follows:

| | Percent by weight |
|---|---|
| Ca(OCN)$_2$ | 35–50 |
| CaCO$_3$ | 30–40 |
| CaO (or Ca(OH)$_2$) | 10–14 |
| Urea | 7–12 |
| Cyanide | nil |

Reactor temperatures within the range of about 200–320° C. can be used to produce calcium cyanate by the process of my invention. Nevertheless, I prefer the range of about 220–260° C., because the reaction proceeds slowly at temperatures below about 220° C., thereby requiring a longer residence time in the reactor, and yields are reduced at high temperatures (e.g., above about 290° C.). I also prefer to maintain the weight ratio of recycled product to urea at about 10:1 to 15:1.

The product of this process is an agricultural grade calcium cyanate analyzing about 35–50% Ca(OCN)$_2$ by weight and suitable for such uses as killing weeds, defoliating plants, and the like. The said product is also suitable for use in some chemical syntheses, and it may be purified by the process of my copending application, Serial Number 268,544, to yield calcium cyanate of high purity.

Calcium cyanate has previously been prepared in a variety of ways. The most generally used method involves heating a mixture of urea and a basic compound of calcium to temperatures of about 130–400° C. Basic calcium compounds which have been used include the oxide, hydroxide, carbonate, and the like. The urea reactant is used in amounts between 100–110% of the stoichiometric amount based on the general equation:

$$CaX + 2NH_2CONH_2 \rightarrow Ca(OCN)_2 + H_2X + 2NH_3$$

where X is O, CO$_3$, or 2OH.

These prior art methods of preparation possess inherent disadvantages. The sticky or gummy nature of the product creates problems in removing product from the reactor. Furthermore, the low thermal conductivity of the reactants and of the product renders the process tedious and inefficient from a heat transfer standpoint.

U.S. Patent 2,801,154 teaches a well recognized method for preparing calcium cyanate from calcium oxide (or hydroxide) and urea. In the said process the individual reactants are ground separately so that the particle sizes are less than about 20 microns (preferably less than about 5 microns) mixed in about stoichiometric quantities, and heated to about 140–200° C. When operating as a continuous process, a rotary drum or similar surface is used to support the reaction mixture in a heated zone. The thickness of the mixture of reactants on the heat exchange surface is very important for producing the product in high yield. It is taught in the aforesaid patent that the thickness of the solid mixture of reactants should be maintained below about 2 inches, and that best results are achieved when the thickness of the mixed reactants is less than about ½ inch.

The aforesaid process is very difficult to carry on (especially when operating in a continuous manner), because, as the reaction progresses, the reacting mass becomes sticky or gummy and adheres strongly to the reactor's surface. Subsequently, as the reaction proceeds further, a solid cake forms in the reactor. By the time the reaction is completed, the material in the reactor is composed of large chunks of solid which adhere very strongly to the reactor's surface. Removing these solid particles is an involved and difficult operation.

Grinding urea to the micron size particles required by said process is also a troublesome process, because urea is resistant to abrasion. Furthermore, pulverized urea rapidly sets into hard lumps and cakes which will not mix intimately with powdered lime.

During one phase of the work leading to this invention, I made the surprising discovery that free flowing particulate calcium cyanate of commercial assay can be obtained by passing a mixture of lime (calcium oxide, hydroxide, or oxide-hydroxide mixture) with about 40–60% of the stoichiometric amount of urea; blending this mixture with at least about 8 parts by weight of product from the process for each part of said mixture; feeding the blended materials to a heated reaction zone; conveying the blended materials through the zone by rotating therein a close-fitting rotatable helix at rates providing a residence time of at least about ½ minute while maintaining the temperature of the moving mass between about 200° and about 275° C., and recovering calcium cyanate product at the discharge end of the heated reaction zone. It was also found that the reactants did not become sticky or gummy when heated if the ratio of recycled product to feedstock (urea and lime mixed in a 1:1 mole ratio) was at least about 8:1 on a weight basis. In view of the very sticky nature of the reacting mass obtained by the process of U.S. Patent 2,801,154 and the well known properties of urea, this is a surprising and completely unexpected discovery.

Subsequent investigation showed that the method which I have discovered for preparing calcium cyanate can be made fully continuous by continuously recycling the required amounts of recovered product to the mixing step, continuously mixing said recycled material with the required amounts of feedstock (urea and lime mixed in about 1:1 mole ratio), and continuously passing the resulting blend of recycled product and feed through a reaction zone heated to about 200–320° C.

Further work also established that, contrary to expectation, when using the process of my invention, it is not necessary to maintain the reaction bed's thickness in the order of ½–2 inches. On the contrary, reaction beds of 5–6 or more inches in thickness have been used with highly satisfactory results. From an economic standpoint this is a very significant discovery, because it reduces size, and thus the cost, of reactors.

While I prefer to prepare a feedstock composed of urea and lime mixed in a urea:lime mole ratio of about 1:1, I have found that this ratio can vary from about 0.8:1 (Ca. 40% of stoichiometric) to about 1.2:1 (Ca. 60% of stoichiometric). When the mole ratio of urea:lime is less than about 0.8:1, yields are commercially unattractive, and ratios greater than about 1.2:1 do not give significant advantages and are thus unnecessary.

The weight ratio of recycled product to feedstock may vary from about 8:1 to about 20:1. If the said ratio is less than about 8:1, a sticky mass forms in the reaction zone when the reaction mixture is heated. This mass plugs the zone, and, as the reaction progresses, forms a hard solid cake which cannot be removed without opening the reactor. Weight ratios of recycled product:feedstock above about 20:1 are not economically attractive. I have found that weight ratios of recycled product:feedstock of about 10–15:1 give excellent results, and I prefer said ratios.

The specific particle size of the urea reactant is not critical. Commercially available particulate urea in the form of crystals, prills, or particles ranging in size from about −15 to about −200 mesh (U.S. Standard) is quite suitable. In most of the runs which have been made −30 mesh (U.S. Standard) urea particles were used for convenience.

Neither is the particle size of lime of critical importance. Obviously lump lime is not acceptable, but lime passing a 16 mesh (U.S. Standard) screen gives satisfactory results. For convenience, I prefer to use lime which passes a 40 mesh (U.S. Standard) screen; very fine lime Ca. −100 mesh, U.S. Standard) has also given excellent results.

I have found that reaction temperatures of about 200–320° C. are satisfactory, but I prefer the range of about 220–260° C. Where the temperature varies throughout the reaction mass, the aforesaid temperature ranges apply to the part of the mass which is nearest the source of heat.

It is impossible to specify an exact reaction time (i.e., residence time in the heated reactor, reaction chamber, or reaction zone), because residence time is an inverse function of both the rate of heat transfer in the system and the temperature at which the reaction is conducted. The rate of heat transfer depends upon the reactor size; said rate is more rapid in a small reactor with a capacity of a fraction of a pound than in a large reactor with a capacity of several hundred pounds. The following table summarizing my results will serve as a guide for a chemist, engineer, or other person skilled in the art, providing he uses the table as a guide to help select the preferred residence time and not as a recipe prescribing absolute and invariable residence times:

| Approximate Reactor Capacity, Lbs. | Approximate Reactor Temp., ° C. | Approximate Residence Time, Minutes |
|---|---|---|
| ¼ | 200 | 1 |
| ¼ | 320 | ½ |
| 125 | 200 | 25 |
| 125 | 320 | 15 |
| 500 | 200 | 35 |
| 500 | 320 | 20 |

The use of one or more helicoid screws 1 is a satisfactory method for conveying the reaction mixture through the reaction zone. The screws can be hollow helices and shafts through which a fluid heat exchange agent passes. Alternatively, and I prefer this alternate when using a reactor with a capacity of above about 50 pounds, the helcoid screws can be replaced with shafts 2 equipped with pug mill type paddles 3 which mix the reaction mass while transporting it through the pyrolsis zone. Numerous other conveying devices suitable for this purpose will be obvious to those skilled in the art. Heating means can be of any desired type, e.g., steam coils, electrical resistance heaters, or heat exchange fluid passages bored or inserted in or wrapped around an enclosed reaction chamber. Thermocouples for measuring the reaction temperature can be mounted on either the outer or inner surface of the reactor's shell, or, in the case of fluid heated reactors, the temperature of the heat exchange fluid may be measured.

*Example 1*

The apparatus used in this example comprised a 20-inch length of nominally 1 1/16-inches inside diameter steel pipe 4 having reversibly inserted therein a one-inch outside diameter rotatable spiral screw 1, also about 20 inches long. The spiral screw had a pitch of about 1.2 inches, i.e., slightly greater than ordinary screw conveyors which have pitches approximately equal to the diameter. The screw was inserted in one end of the tube and mounted on a bearing 5. An extended shaft 16 on the spiral screw at the bearing end of the tube was detachably connected to the drive shaft 17 of an electric motor; and rotation of the screw was controlled by means of a variable speed transmission 7 on the motor. A hole 8 was bored through the top of the tube about two inches from the bearing end and a funnel 9 was welded about the hole and perpendicular to the tube wall to serve as a feed chamber. Two thermocouples (not shown) were attached to the outer surface of the 20 inch tube about 8 and 12 inches, respectively, from the bearing end. These devices were used to measure the skin temperature of the heated section (reaction zone). A 26 foot length of Chromel electric resistance wire 10, insulated with ceramic beads 11, was spirally wrapped about tube 4 and bedded down and held in place with a refractory cement 12. Asbestos pulp 13 about ½ inch thick was coated over the cement to insulate the tube and to protect the cement. The temperature of the tube was controlled by a variable transformer 14 connected to the lines 15 leading to the electric resistance wire.

A heel of calcium cyanate (49% $Ca(OCN)_2$, by weight) was prepared by heating small batches of a mixture of urea and lime (calcium oxide) blended in a 1:1 mole ratio in containers placed in a liquid medium heat transfer bath maintained at about 190° C. for periods of about 90 minutes. Lumps of the resulting product were broken up and crushed to a powder (ca. —30 mesh, U.S. Standard). A 300 g. portion of this material was used as a simulated recycle stock when starting the run.

The feedstock was a blend of urea and calcium oxide mixed in a 1:1 mole ratio. Each of the said materials had been passed through a 30 mesh (U.S. Standard) screen to break lumps and agglomerates before mixing.

A 20 gram portion of the said feedstock was blended with 300 grams of the aforesaid simulated recycle stock and the resulting mixture was fed through the above described screw conveyor reactor. The temperature (measured by the thermocouples located on the outside of the reactor's shell) was maintained between about 244° and 254° C. The spiral screw was rotated at 50 revolutions per minute, thereby providing a residence time of about ½ minute per pass. After each pass a 300 gram portion of the product was recycled for blending with another 20 gram portion of the feedstock. The procedure was repeated 17 times (making a total of 18 passes), feeding a blend of 20 grams of feedstock with 300 grams of the next preceding product to the reactor for each run.

The total recovered product weighed 587 grams, and contained 46% by weight of calcium cyanate, representing a yield of 64% of theoretical based on urea charged. The entire run was trouble free. The product was free flowing, granular, readily friable, and easily handled.

*Example 2*

The conditions and procedures in this example were the same as in Example 1 except that the spiral was rotated at 30 revolutions per minute and the recycle ratio was 10 to 1 instead of 15 to 1. The recycle stock was the calcium cyanate made in Example 1.

Again the entire run was trouble free. The calcium cyanate product had the same physical properties as the product made in Example 1. The product analyzed 45% by weight calcium cyanate, representing a yield (based on urea charged) of 70% of theoretical.

*Example 3*

The conditions and procedures were the same as those described in Example 2. Recycle stock was a composite of calcium cyanate made in earlier runs, analyzing 37% by weight $Ca(OCN)_2$. Individual feed charges were prepared by blending 1000 grams of this recycle stock with 100 grams of feedstock.

The reactor was continuously operated under these conditions for 8 hours a day over a period of 10 days. At no time were there any operating difficulties. During the run approximately 20 kilograms of feedstock were converted into 17 kilograms of calcium cyanate product having the following typical chemical analysis:

| | Percent by weight |
|---|---|
| Calcium cyanate | 43 |
| Calcium carbonate | 35 |
| Calcium oxide | 12 |
| Urea | 10 |
| Cyanide | nil |

The overall conversion, based on urea charged, was 68% of theoretical.

The product had excellent handling characteristics. It was commercially acceptable for such agrcuiltural uses as defoliation of growing crops and weed killing.

*Example 4*

The conditions and procedures of the preceding examples were used in preparing calcium cyanate product from calcium hydroxide and urea. The product analyzed 45% $Ca(OCN)_2$, which represented a yield of 73% of theoretical, based on urea charged. The product from this run had the same physical characteristics as those described in previous examples.

*Example 5*

An attempt was made to repeat the run described in Example 2 with use of a lower recycle ratio. The ratio used was 7 to 1 while all other conditions remained essentially the same. After a short period of operation (about 5 passes) the reactor began to clog and increased power was required to maintain rotation of the spiral. As operation was continued the product became more and more gummy and tacky. Eventually (after 9 passes) the reactor became extremely difficult to operate and the product was commercially unacceptable. At this point the run was discontinued.

The results of this example vividly illustrate the necessity for maintaining a recycle ratio of at least 8 to 1 in the process of this invention.

*Example 6*

The apparatus for this run consisted of an indirect heated (hot oil), covered, screw conveyor type heat exchanger ("Holo-Flite" Processor), with an entrance and an exit, but modified by replacing the screws with rotating shafts equipped with pug mill type paddles. The said apparatus was adjusted to provide a residence time of about 35 minutes. When operating this reactor solid product leaving the reactor was collected in a drum while vapors and dust were chanelled to an exhaust line which vented into the atmosphere. A small amount of calcium cyanate product was recovered from the vent system.

A heel of calcium cyanate for use as a simulated recycle stock when starting the continuous production of cyanate in this reactor was prepared by mixing 800 lbs. of lime (calcium oxide, —60 mesh U.S. Standard) with 86 lbs. of —20 mesh (U.S. Standard) particulate urea (i.e., mole ratio CaO:Urea, 10:1) and passing the resulting mixture through the heated reactor. Increments of product exiting the reactor were collected, mixed with urea in a lime: urea mole ratio of about 10:1 (based on the lime originally present) and returned to a hopper that fed the mixture into the reactor, thereby permitting the reaction to be conducted on a fully continuous basis. This procedure was continued until a total of 794 lbs. of urea had been utilized. Residence time of the reactants in the reactor was about 35 minutes per pass, and the temperature of the oil heat exchange medium was about 260° C. The product (ca. about 1200 lbs.) was granular and free flowing; it substantially passed through a 20 mesh (U.S. Standard) screen and analyzed about 40% by weight $Ca(OCN)_2$.

Feedstock for the continuous run was prepared by mixing the above described lime and urea in 1:1 mole ratio. A total of about 4250 lbs. of feedstock was prepared.

Before starting this run, 40 lbs. of said feedstock was mixed with 400 lbs. of the aforesaid calcium cyanate heel, thereby giving a reaction mixture composed of calcium cynate heel and feedstock mixed in a 10:1 weight ratio. The reaction mixture was placed in a hopper above the intake end of the reactor. The heat exchange oil was brought to temperature, and the reactor was charged with reaction mixture.

The rotating shafts were started and product was discharged continuously from the exit end of the reactor at the rates varying from 60-150 lbs. per hour (with a maximum residence time exceeding 1 hour) while simultaneously feeding the reaction mixture into the reactor at about the same rate. About 5% of the product exiting the reactor was collected and set aside; the remainder was mixed, on an incremental basis, with feedstock in the weight ratio of 10 parts of product to 1 part of feedstock and returned to the feed hopper before said hopper had become empty, thereby permitting fully continuous operation of the process. This was continued until a total of 4250 lbs. of feedstock had been passed through the reactor. During this period the temperature of the heat exchange medium was maintained within the range of about 260–315° C. The total product weighed about 3012 lbs. and analyzed about 35% Ca(OCN)$_2$. Said product was a free flowing granular solid which substantially passed through a 20 mesh (U.S. Standard) screen.

What is claimed is:

1. In the process for preparing agricultural grade calcium cyanate analyzing about 35–50% Ca(OCN)$_2$ by weight from lime and urea in a heated reaction zone at substantially atmospheric pressure, the improvement comprising mixing one part by weight of a feedstock consisting essentially of particulate urea and particulate lime blended in a urea:lime mole ratio of about 0.8–1.2:1 with about 8–20 parts by weight of a diluent consisting essentially of product from said process and passing the thus formed mixture through said reaction zone at such rate as to provide a residence time therein of at least about ½ minute while maintaining the reaction zone at about 200–320° C., thereby obtaining a free flowing particulate product consisting essentially of calcium cyanate, calcium carbonate, and unreacted lime and urea.

2. The process according to claim 1 in which the temperature is about 220–260° C.

3. The process according to claim 1 in which the feedstock is composed of particulate urea and particulate lime mixed in a urea:lime mole ratio of about 1:1.

4. The process according to claim 1 in which the weight ratio of diluent to feedstock is about 10–15:1.

5. The process according to claim 1 in which said process is conducted in a fully continuous manner.

6. The method for initiating the process according to claim 1 in which a heel of calcium cyanate analyzing about 35–50% Ca(OCN)$_2$ by weight for use as simulated recycle stock is prepared by blending lime and urea in a lime:urea mole ratio of about 10:1, passing the resulting mixture through the heated reaction zone, collecting the product, blending said product with about 0.1 mole of urea for each mole of lime originally present, passing the thus formed mixture through the said reaction zone, and repeating said procedure until about 1 mole of urea has been added for each mole of lime originally present.

7. The method of preparing calcium cyanate comprising:
 (a) blending urea and lime in a urea:lime mole ratio of about 0.8–1.2:1 to form a feedstock;
 (b) blending said feedstock with calcium cyanate reaction product in a product:feedstock weight ratio of 8–20:1;
 (c) passing said product-feedstock blend through a reaction zone maintained at 220–260° C. and ambient pressure for a residence time of at least ½ minute;
 (d) discharging reaction product consisting essentially of calcium cyanate, calcium carbonate, and unreacted lime and urea from said reaction zone;
 (e) dividing said product into a first portion and a second portion in a ratio such that the second portion is 8–20 parts by weight of the aforesaid feedstock;
 (f) recycling said second portion as calcium cyanate reaction product to (b) above; and
 (g) less recovering the said first portion as free-flowing product consisting essentially of calcium cyanate, calcium carbonate, and unreacted lime and urea.

References Cited by the Examiner
UNITED STATES PATENTS

| | | | |
|---|---|---|---|
| 695,037 | 3/1902 | Craig | 23—277 X |
| 2,801,154 | 7/1957 | De Pree et al. | 23—75 |
| 2,889,198 | 6/1959 | Barrett et al. | 23—75 |
| 2,964,532 | 12/1960 | Klenke | 23—279 |

BENJAMIN HENKIN, *Primary Examiner.*

MAURICE A. BRINDISI, *Examiner.*